(12) United States Patent
Maia et al.

(10) Patent No.: US 12,711,422 B2
(45) Date of Patent: Aug. 18, 2026

(54) STOCHASTIC LAYER-WISE AVERAGING AGGREGATION FOR FEDERATED LEARNING

(71) Applicant: Dell Products L.P., Round Rock, TX (US)

(72) Inventors: Isabella Costa Maia, São Paulo (BR); Iam Palatnik de Sousa, Rio de Janeiro (BR); Maira Beatriz Hernandez Moran, Rio de Janeiro (BR); Paulo Abelha Ferreira, Rio de Janeiro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 907 days.

(21) Appl. No.: 18/062,158

(22) Filed: Dec. 6, 2022

(65) Prior Publication Data

US 2024/0185118 A1 Jun. 6, 2024

(51) Int. Cl.
*G06N 20/00* (2019.01)
*G06F 21/62* (2013.01)

(52) U.S. Cl.
CPC ......... *G06N 20/00* (2019.01); *G06F 21/6245* (2013.01)

(58) Field of Classification Search
CPC ............................ G06N 20/00; G06F 21/6245
See application file for complete search history.

(56) References Cited

U.S. PATENT DOCUMENTS

2021/0383280 A1* 12/2021 Shaloudegi ............. G06F 17/18
2022/0129786 A1 4/2022 Da Silva et al.
2022/0292387 A1* 9/2022 Zhou ................... G06N 3/0442

OTHER PUBLICATIONS

Mei, Yuan, Binbin Guo, Danyang Xiao, and Weigang Wu. "Fedvf: Personalized federated learning based on layer-wise parameter updates with variable frequency." In 2021 IEEE International Performance, Computing, and Communications Conference (IPCCC), pp. 1-9. IEEE, 2021. (Year: 2021).*

Ma, Xiaosong, Jie Zhang, Song Guo, and Wenchao Xu. "Layer-wised model aggregation for personalized federated learning." In Proceedings of the IEEE/CVF conference on computer vision and pattern recognition, pp. 10092-10101. 2022. (Year: 2022).*

Geiping, Jonas, et al. "Inverting Gradients—How easy is it to break privacy in federated learning?" Advances in Neural Information Processing Systems 33 (2020): 16937-16947.

Lin, Yujun, et al. "Deep Gradient Compression: Reducing the Communication Bandwidth for Distributed Training." arXiv preprint arXiv:1712.01887 (2020).

* cited by examiner

*Primary Examiner* — Casey R. Garner
(74) *Attorney, Agent, or Firm* — Workman Nydegger

(57) ABSTRACT

One method includes stochastically selecting, by a central node, a subset of edge nodes from a group of edge nodes that collectively defines a federation, querying, by the central node, the edge nodes of the subset for updates to a global model maintained by the central node, receiving, by the central node from the edge nodes of the subset, respective updates to one or more layers of the global model, and updating, by the central node, the global model, using the updates received from the edge nodes of the subset.

20 Claims, 7 Drawing Sheets

200

```
Inputs{
      -R rounds of FL
      -a learning model with L Layers
      -a Federated network with N nodes and a server
      -P participants per layer
      -a binary participation NxL matrix A
      -param_selected(node,layer) function that returns the parameters
of a given layer 1 from node n}
global_model(Inputs*):
      For r in R:
            for 1 in range(L):
                  Param_server[1] = 0 # tensor with layer shape
                  For n in N:
                        if A[n,1]==1:
                              Param_server[1]+= param_selected(n,1)
                  Param_server[1] /= P
      2. Send server's model to N nodes
      3. Each node retrain the received model with local data and do
      backpropagation, updating their parameters
```

```
Inputs{-a learning model with L Layers
      -a Federated network with N nodes and a server
      -P participants per layer
      -p_i_min the minimum number of times each node participates
      -p_i_max the maximum number of times each node participates }
participation_matrix(Inputs*):
      Assert p_i_min <=P*L/N and p_i_max >=P*L/N
      times_nodes_participated := [p_i_min]*N
      times_layers_participated := [0]*L
      participation_matrix := zeros(N,L)
      #force a minimum participation p_i_min for each node:
            For n in N:
                  chosen_layers = random_sample(p_i_min layers indexes
      where times_layers_participated<P)
                  for cl in chosen_layers:
                        participation_matrix[n,cl] = 1
                        times_layer_participated[cl] +=1
      #complete columns such that columns sum up to P and rows sum up
      #to at most p_i_max
      For l in range L:
            remains_to_chose = P - times_layers_covered[1]
            If remains_to_chose >0:
                  chosen_nodes = random_sample(remains_to_chose nodes
where  times_nodes_participated<p_i_max  and  where  node  was  not
previously selected for that layer)
                  for cn in chosen_nodes:
                        participation_matrix[cn,1]=1
                              times_nodes_participated[cn] +=1
      return participation_matrix
```

FIG. 3

STOCHASTIC LAYER-WISE AVERAGING AGGREGATION FOR FEDERATED LEARNING

FIELD OF THE INVENTION

Some embodiments of the present invention generally relate to federated learning. More particularly, at least some embodiments of the invention relate to systems, hardware, software, computer-readable media, and methods, for federated learning processes that may achieve convergence performance, while maintaining data privacy.

BACKGROUND

Federated Learning (FL) is a strategy for distributed training of Artificial Intelligence (AI) models, where multiple nodes contribute to the training of a central model by sending their individual gradient updates, that is, changes to the model, to a central server. This is particularly relevant with the rise of edge related applications and the advent of large multicenter or multiorganization collaborations, where pooling the data and resources from various nodes can create much stronger models, as compared to an approach in which each node trains its own respective model or model instance.

Although the individual gradients sent by the nodes may be intended to be kept private, such as where a node comprises or is associated with a particular client for example, some techniques can be employed to reveal the gradient values. Once in possession of the gradients, various adaptive methods can be employed by bad actors to create data that generates similar gradient responses from the model. The resulting generated data closely resembles the private training data, and as such may breach privacy. This attack is sometimes referred to as "model inversion," and could be performed, for example, by a malicious node or by the server itself, that is, the server that receives the gradients from the nodes.

One possible defense against model inversion is called "gradient pruning," where each edge node sends gradients with less than full information. However, sending less information can impair global model convergence, that is, convergence to a solution to a problem that the model was intended to solve.

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

BRIEF DESCRIPTION OF THE DRAWINGS

FIG. 2 discloses an example pseudo-algorithm for building a stochastic layer-wise averaging global model across multiple FL (federated learning) rounds.

FIG. 3 discloses an example algorithm for filling a binary N×L participation matrix where each column sums up to P and each row sum is between p_i_min and p_i_max.

DETAILED DESCRIPTION OF SOME EXAMPLE EMBODIMENTS

Figure 1:
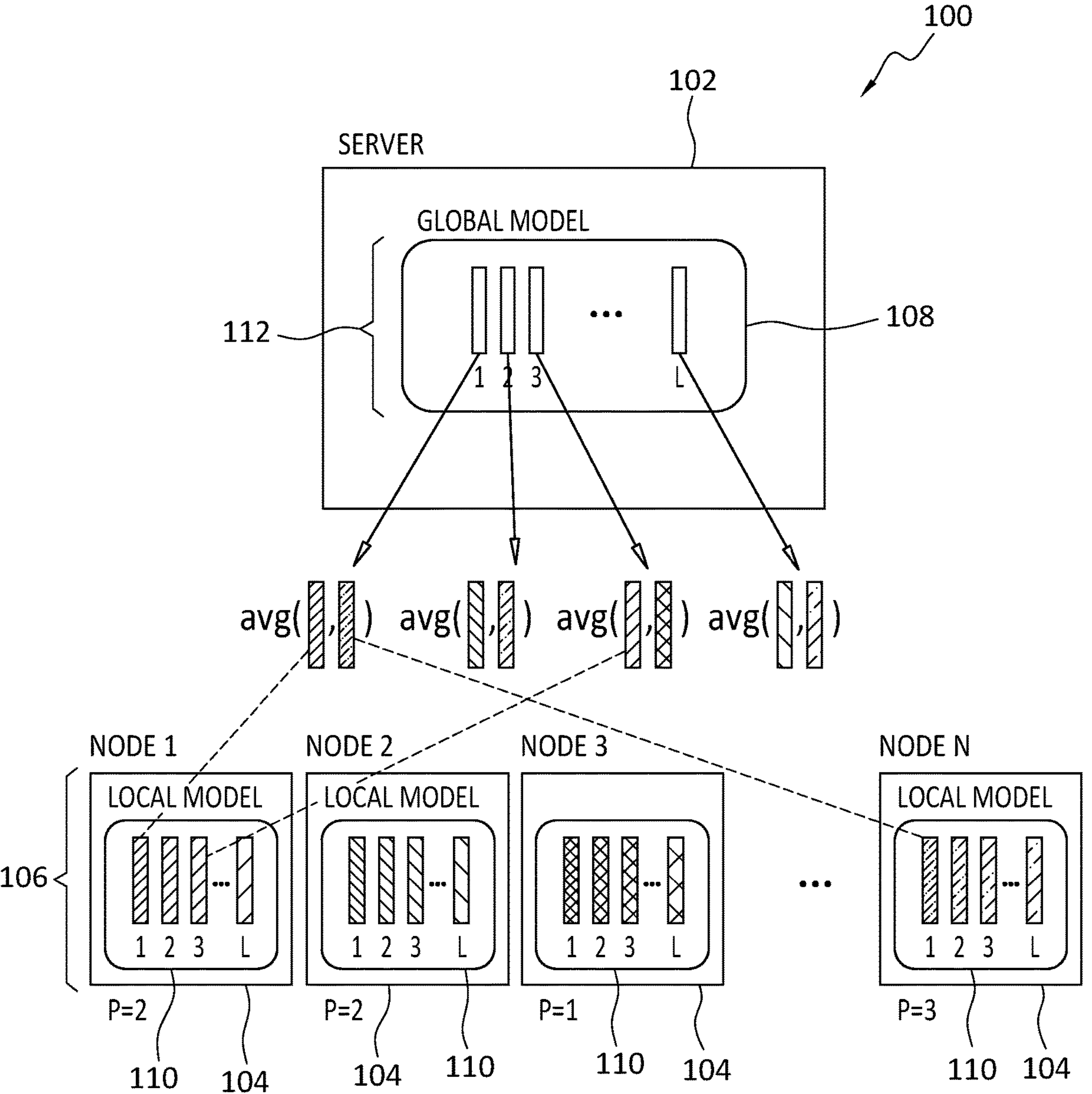
FIG. 1 discloses aspects of an example federated learning environment in which an embodiment of the invention may be implemented.

Some embodiments of the present invention generally relate to federated learning. More particularly, at least some embodiments of the invention relate to systems, hardware, software, computer-readable media, and methods, for federated learning processes that may achieve convergence performance, while maintaining data privacy.

In general, one or more example embodiments of the invention may be implemented in a federated learning environment that comprises one or more edge nodes, each running a respective instance of a model that resides at a central node. The edge nodes may collectively form a federation. The central node, which may comprise a server for example, may comprise storage and processing resources adequate to receive gradients from the edge nodes, update the model, and disseminate the updated model to the edge nodes. The model, which may have a configuration comprising multiple layers, may be configured to perform one or more functions relating to the edge nodes where the model instances are deployed.

In one example embodiment, one or more of the edge nodes, but fewer than all of the nodes, in the federation may transmit respective model gradients to the central node. The nodes that send the gradients may be stochastically selected by the central node. The gradients may be averaged by the central node, and the corresponding layer(s) of the model updated accordingly by the central node. The gradients received by the central node may be collectively adequate to enable the model to reach convergence, but since the central node may not receive a full set of gradients from all the nodes in the federation, the sparseness of the gradient information received at the central node may render that information resistant to attack.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may train a model to attain convergence, while doing so in a way that may preserve the privacy of the gradient information used to update the model. An embodiment may train a model to achieve acceptable performance using only a sparse information set for the training. An embodiment may, by using sparse gradient information, reduce the burden imposed on network resources relative to what that burden would be if full gradient information were employed. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, a federated learning environment. With particular attention now to FIG. 1, one example of an operating environment for embodiments of the invention is denoted generally at 100. In general, the operating environment 100 may take the form of a federated learning environment that may comprise a central node 102, which may comprise a server, that is operable to communicate with a set of nodes 104 that collectively define a federation 106. In an embodiment, one or more of the nodes 104 may comprise an edge device, comprising hardware and/or software, examples of which include, but are not limited to, an IoT (internet of things) device, or a sensor. The central node 102 may maintain a model, such as a machine learning (ML) model 108, and respective local instances 110 of the model 108 may be deployed at each of the nodes 104. The model 108 and local instances 110 may be configured to perform various functions relating to the nodes 104. In an embodiment, each of the nodes 104 may be associated with a different respective client, such as a business entity for example, that is served by the central node 102.

B. Aspects of Some Example Embodiments

In general, one or more embodiments of the invention may operate to implement a trade-off between defending against model inversion by sharing less information, such as gradients, from the nodes of a federation, while also maintaining model training convergence. Thus, one or more embodiments comprise a method for updating the central model without requiring the complete update information from each node, thus possibly mitigating security breaches, and sparing network resources while preserving model convergence.

Note that as used herein, a "gradient" may comprise, but is not limited to, one or more changes to a local model 110 that have been identified by the node 104 where that local model 110 is running. The changes may be identified, for example, by comparing an output of the local model 110 with actual results observed by/at the node 104. A gradient may comprise, for example, private, confidential, information associated with an entity, such as a client for example, that owns/controls the node 104 where that information is generated and/or collected. A gradient may be a "full gradient" insofar as that gradient comprises complete model update information, that is, the gradient includes all layers of the model, generated at/by a node 104. On the other hand, a gradient may be a "sparse gradient" insofar as that gradient comprises less than complete model update information, that is, the gradient has only a subset of the layers of the model, generated at/by a node 104. This is discussed in further detail below in connection with FIG. 1.

B.1 Creation and Modification of the Central Model

With continued reference now to the example of FIG. 1, there is disclosed an example of global model 108 construction for P=2, and node 104 contributions respecting p_min=1 and p_max=3. In FIG. 1, "P=2" in reference to "Node 1" 104 and "Node 2" 104 means that those nodes 104 have each contributed to global model 108 with the parameters gradients from 2 layers. In contrast, in the example of FIG. 1, "Node 3" has only contributed a gradient to the global model 108 a single time, while "Node N" has contributed a gradient 3 times to the global model 108. In the example of FIG. 1, a variable p_min may be set to 1, and a variable p_max set to 3. These values, which are presented only by way of example, mean that in this illustrative example, each node 104 will contribute the parameters gradients from at least 1 layer to the global model 108, and will contribute a maximum of 3 gradients to the global model 108. These variables may be employed, for example, to help ensure that the contribution of a given node 104 is not unduly overweighted with respect to the contribution of one or more other nodes 104.

As an example of the use of a sparse gradient to update a model, attention is directed to Node 1 104 in FIG. 1. As shown, only layers 1 and 3, collectively defining an example gradient, of the local model 110 of Node 1 are sent to the central node 102 for use in updating the global model 108. Note that the gradient(s) contributed by a particular node 104 may be different from each other, and may vary from one round of a federated learning process to the next round of that federated learning process.

In an embodiment, respective weights, and/or other parameters, of the various layers received by the central node 102 may be averaged together, or otherwise combined, to define a new or modified layer of the global model 108. For example, it can be seen that layer 1 of the global model 108 comprises an average of layer 1 of node 1, and layer 1 of node N. The other layers of the global model 108 may be similarly constructed, using an average of the respective parameters of layers received from one or more of the nodes 104. In this way, the central node 102 may, in each round of an example FL process, build the global model 108 in a layer-wise fashion, such that each layer L 112 of the global model 108 comprises an averaging result from P.

B.2 Formalization of Node Participation

With continued attention now to the example of FIG. 1, the participation of the nodes 104 in the average value of each layer 112 of the central model 108 may be formalized as an N× L binary matrix, or participation matrix, where the entry $a_{i,j}$='1' if node i participated in the averaging of layer j of a central model and $a_{i,j}$='0' otherwise. An algorithm according to some embodiments may operate to fill this participation matrix randomly, but in such a way that the central model guarantees a complete coverage by layer. That is, each layer of the central model has at least one participating node. An embodiment may have P participating nodes, out of a total of N nodes in a federation. This means that all columns in the N×L binary matrix sum to:

$$P\left(\Sigma_{j=1}^{N} a_{i,j} = P, \forall\, i\right)$$

Also, each node may be guaranteed a number of participations between given values $p_{min}$ and $p_{max}$. In other words, each node may participate with at least $p_{min}$ layers, and at most $p_{max}$ layers, which may be expressed as:

$$\left(p_{min} < \Sigma_{i=1}^{L} a_{i,j} = p < p_{max},\, , \forall\, i\right)$$

B.3 Example Methods and Algorithms

As disclosed herein, some example embodiments may provide for methods and algorithms that may perform a variety of functions. For example, and with reference to the non-limiting example of FIG. 1, an embodiment may comprise a defense method against model inversion, in which a central node 102 may stochastically choose one or more nodes 104 to participate in averaging update values for each layer 112 in the central model 108. Note that as used herein, "stochastic" (and its forms) refer, but are not limited to, to a property of being well described by a random probability distribution (see, e.g., en.wikipedia.org/wiki/Stochastic).

As well, an embodiment may comprise a pruning method that presents regularization, or generalization, properties, such that the method may be employed for the purpose of global model generalization. As a final example, an embodiment may comprise a method that may significantly reduces the number of shared layers containing the parameters gradients, and as such, one or more embodiments may be especially beneficial in network constrained scenarios, that is, scenarios where network, and other, resources may be limited.

Below, there is presented empirical evidence for the efficacy of one or more embodiments concerning the capability of such embodiments to hinder a privacy attack while maintaining acceptable convergence performance of the global model. An embodiment may operate to eliminate gradients in a constrained fashion such that, whenever considering a parameter gradient dropped out, all other parameters from that same layer may also be ignored. Put another way, each layer of a model may have multiple different parameters, each of which, in turn, may have a respective gradient. When an update is sent from a node to the central node, the update may be sent layer-wise, that is, in the form of one or more new or modified layers, rather than being sent on an individual parameter, basis. Thus, one example of an update may comprise updates to all gradients that are included in a particular layer. Moreover, an embodiment may define a range of times that a given node contributes to the federation by sending its layer update(s), as well the number of participants the server will call to participate in each layer averaging operation.

In general, one or more embodiments may be applicable to any domain that may benefit from a FL scenario, and where data privacy might be desirable or mandatory in an increasingly complex regulatory landscape. Some common examples include hospitals with private patient information, cellphones with personal private photos, conversations, self-driving vehicles, voice recordings, among many others. A central concept of some FL processes may be to ensure privacy of data during training rounds.

FIG. 2 discloses an example algorithm 200 that may operate to average the parameters from all nodes that participated in updating a given layer of a central model. Particularly, the algorithm 200 may operate to build a stochastic layer-wise averaging global model across multiple FL rounds. Recall that the number of participant nodes is P for all layers, so the algorithm 200 may need only sum the number of all participants and divide that sum by P.

FIG. 3 discloses an example algorithm 300 for stochastic selection of nodes to participate in an updating process for a central model. Particularly, the algorithm 300 may operate to fill a binary N×L node participation matrix, or simply "matrix," in which each column of the matrix sums up to P and the sum of each row of the matrix is no less than p_i_min, and no more than p_i_max.

B.4 Experimental Evidence

Figure 4:
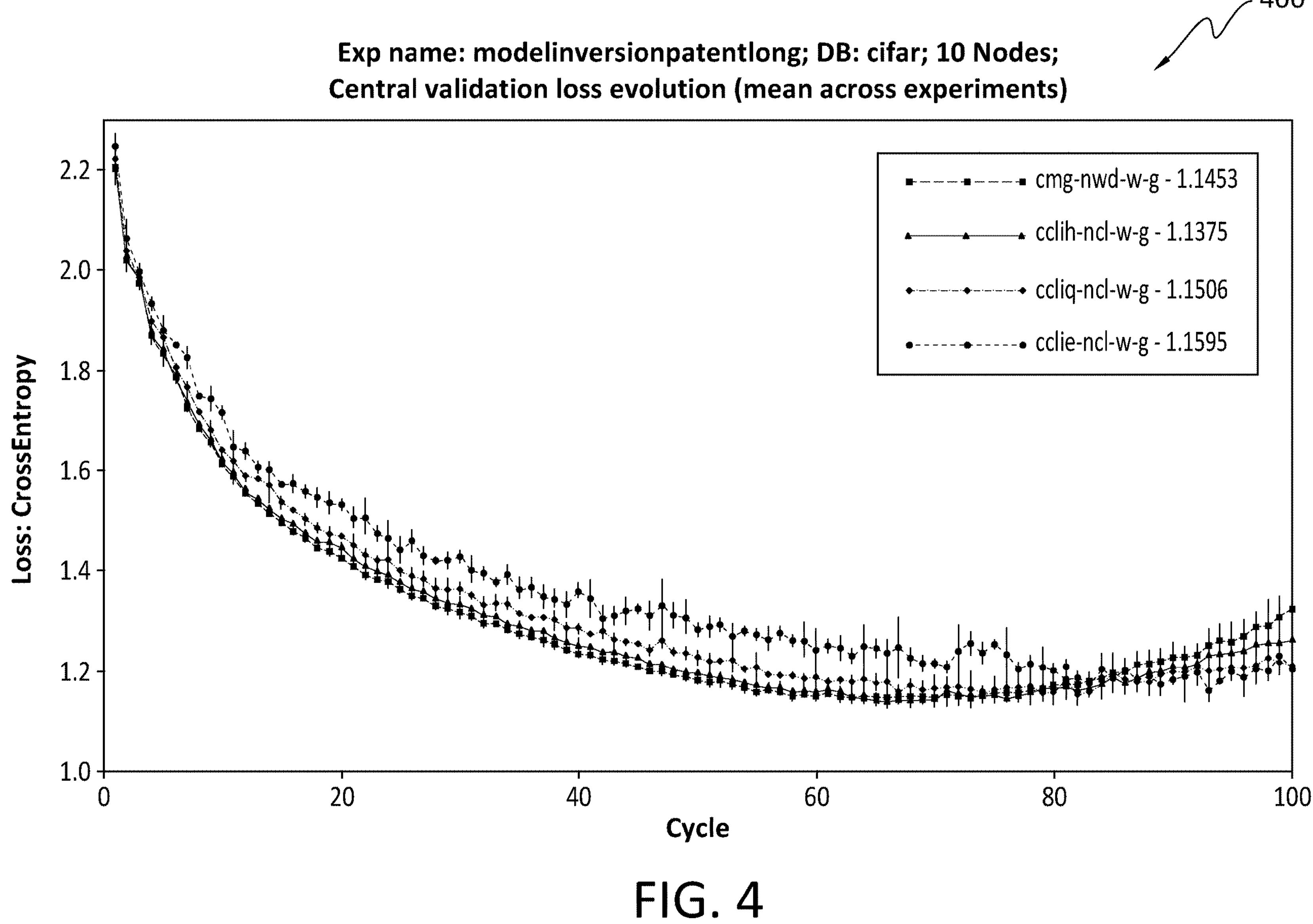
FIG. 4 discloses a CrossEntropy loss throughout federated training cycles comparing a conventional FL scenario (lowermost curve) with different experimental setups (other curves).
Figure 5:
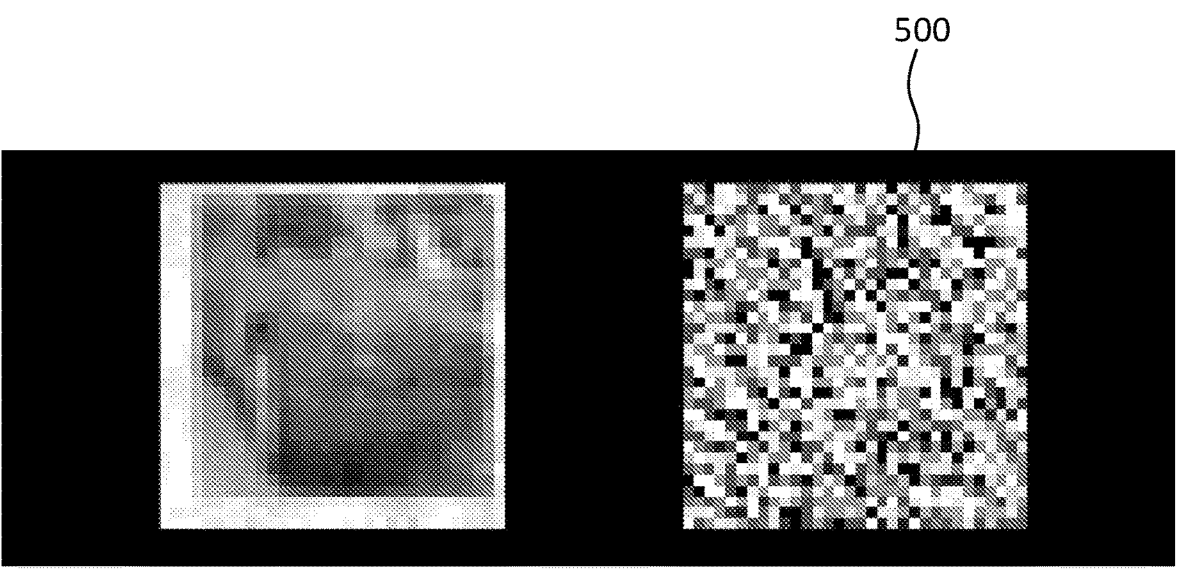
FIG. 5 discloses some experimental results of a model inversion attack under full access to update parameters, or gradients, (left) and under stochastic layer-wisely pruned gradients, according to one embodiment, with p_min=p_max=¼*L (right).

With reference now to FIGS. 4 and 5, some example experimental evidence 400 is presented. Particularly, FIG. 4 discloses CrossEntropy loss throughout training cycles comparing a conventional FL scenario (lowermost curve) with different experimental setups (other curves). A technique according to one embodiment was tested for its effects both in (1) hindering model inversion, and (2) maintaining model convergence. Using an FL simulator, the respective convergence rates for the following were compared:

$$p_{max}, P \in \left\{\frac{1}{8} * L, \frac{1}{4} * L, \frac{1}{2} * L, L\right\}^2, p_{max} = P \text{ and } p_{min} = 0$$

The results of these comparisons are disclosed in FIG. 4.

Particularly, the curves disclosed in FIG. 4 were obtained with the following respective setups:

- cmg-nwd-w-g: pmax=P=pmin=L—Usual FL scenario, with FedAvg;
- cclih-ncl-w-g: pmax=P=½*L, pmin=0—Half of the nodes selected by layer, a node participating, at most, ½*L times;
- ccliq-ncl-w-g: pmax=P=¼*L, pmin=0—A quarter of the nodes selected by layer, a node participating, at most, ¼*L times; and
- cclie-ncl-w-g: $p_{max}$=⅛*L, $p_{min}$=0—an eighth of the nodes selected by a layer, a node participating, at most, ⅛*L times.

All the tested models reached fair convergence and even presented regularization properties, that is, a relatively smaller/slower growth in error of the central model, compared to the usual FL scenario, achieving better performance for scenarios with many training epochs.

Turning next to FIG. 5, experimental evidence 500 concerning the performance of an example embodiment can be seen with respect to the effect of privacy breaching in the case of an attacker having access to the stochastic layer-wisely pruned gradient from a single node, as compared with the original model inversion scenario. Particularly, FIG. 5 discloses the results of a model inversion attack in which the attacker has full access to update parameters (left), and the results of the same model inversion attack when an embodiment of the invention is employed as a defense to that attack, namely, through the use of stochastic layer-wisely pruned gradients with p_min=p_max=>¼*L (right). As can readily be seen, when full gradients are used to update the model, as at the left, the attacker may be able to gain significant insights as to the nature and operation of the model. On the other hand, when pruned, or sparse, gradients are used to update the model, the information obtained by the attacker, at right, may be of little or no use. In this way, for example, the privacy of the gradient information may be preserved through the use of an example embodiment of the invention.

That is, as verified in the example of FIG. 5, the setting with pmax=¼*L was completely effective against model inversion. Intuitively, configurations in which this value is even lower are safer and, as attested above, still present convergence. In contrast with example embodiments, an approach aimed at pruning update gradients in an unstructured fashion, such as without the use of stochastic node selection for example, would require a high level of sparsity in the gradients, which in turn would necessarily imply a high loss in the accuracy of the global model.

C. Example Methods

Figure 6:
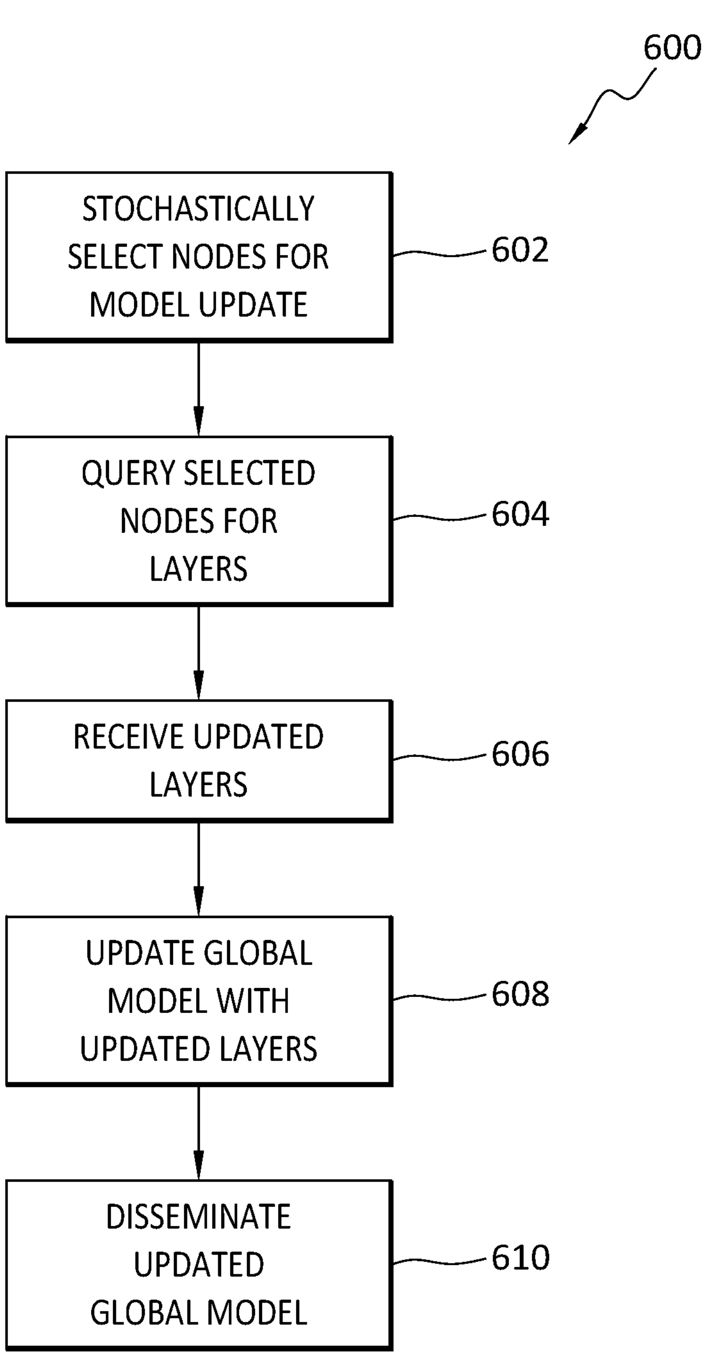
FIG. 6 discloses an example method according to one embodiment.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method according to one embodiment is denoted generally at 600. In an embodiment, part or all of the method 600 may be performed by/at a central node that maintains a global ML model. The ML model need not be of any particular type or functionality.

The example method 600 may begin when a central node, possibly operating in a federated learning environment that may comprise a group of nodes collectively forming a federation, stochastically selects 602 a subset of the federation nodes to provide updates to a central, or global, model maintained at the central node. After the nodes have been selected 602, the central node may then query 604 the selected nodes to obtain updates, which may comprise new and/or modified layers of respective model instances running at the nodes.

Next, the central node may receive 606 the updated layers from the nodes that were queried 604. The central node may then update 608, such as by averaging weights of the layers received from the nodes, the global model. The updating 608 may comprise replacing one or more layers of the global model with averages of the weights of the layers received from the nodes. In an embodiment, an updated layer incorporated into a global model may comprise an average of respective weights of modified layers received from two or more of the nodes in the subset that was queried at 604.

Finally, the central node may then disseminate 610 respective instances of the updated global model to the various nodes of the federation. Note that while only a subset of the nodes in the federation may have contributed to the update of the global model, the updated global model may nonetheless be disseminated to all the nodes of the federation, and not only to the nodes in the subset.

D. Further Example Embodiments

Following are some further example embodiments of the invention. These are presented only by way of example and are not intended to limit the scope of the invention in any way.

Embodiment 1. A method, comprising: stochastically selecting, by a central node, a subset of edge nodes from a group of edge nodes that collectively defines a federation; querying, by the central node, the edge nodes of the subset for updates to a global model maintained by the central node; receiving, by the central node from the edge nodes of the subset, respective updates to one or more layers of the global model; and updating, by the central node, the global model, using the updates received from the edge nodes of the subset.

Embodiment 2. The method as recited in embodiment 1, wherein there is a specified minimum and/or maximum number of nodes in the subset.

Embodiment 3. The method as recited in embodiment 1, wherein the global model is a machine learning model.

Embodiment 4. The method as recited in embodiment 1, wherein the updates comprise layers of one or more local instances of the global model running at the edge nodes.

Embodiment 5. The method as recited in embodiment 1, wherein each node that contributes an update transmits fewer than all layers of a model instance running at that node.

Embodiment 6. The method as recited in embodiment 1, wherein the updates each comprise one or more gradients.

Embodiment 7. The method as recited in embodiment 1, wherein the selecting, querying, receiving, and updating, are each performed for 'n' federated learning rounds until the global model converges, and 'n' is any integer equal to, or greater than, 1.

Embodiment 8. The method as recited in embodiment 1, wherein the updating comprises averaging respective parameter values of the updates to define respective parameter values for one or more layers of the global model.

Embodiment 9. The method as recited in embodiment 1, wherein the edge nodes selected for inclusion in the subset change from one round of federated learning training to another round of the federated learning training.

Embodiment 10. The method as recited in embodiment 1, wherein each node in the subset is limited to a number of times that that node will be queried for updates.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
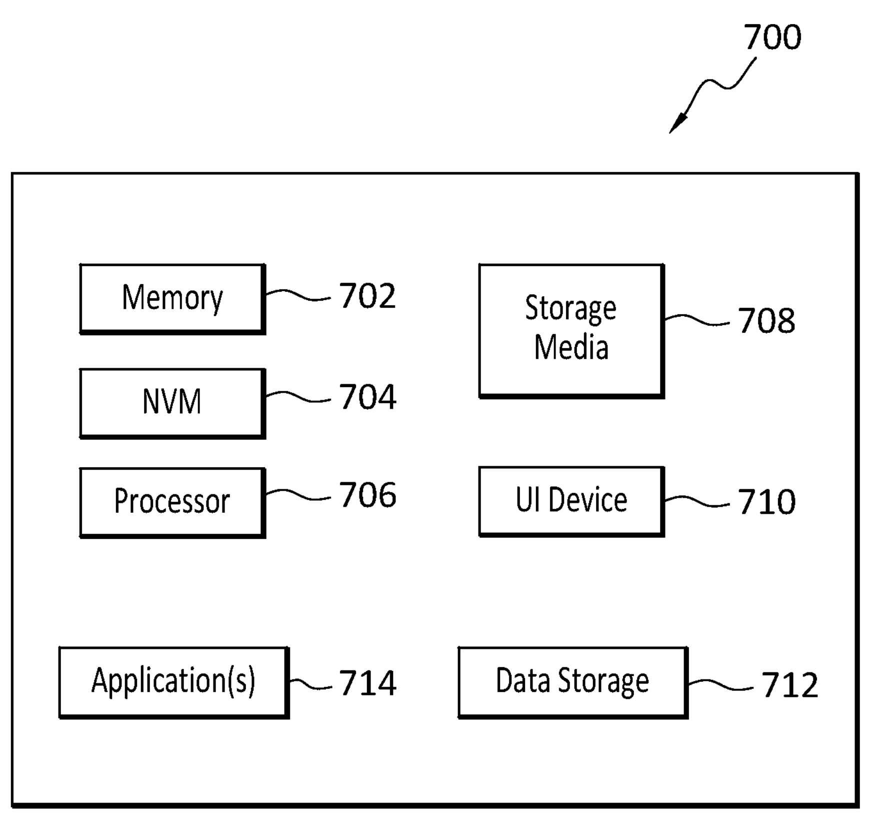
FIG. 7 discloses an example computing entity operable to perform any of the disclosed methods, processes, and operations.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI (user interface) device 710, and data storage 712. One or more of the memory components 702 of the physical computing device 700 may take the form of solid state device (SSD) storage. As well, one or more applications 714 may be provided that comprise instructions executable by one or more hardware processors 702 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

stochastically selecting, by a central node, using a processor-implemented random sampling algorithm that populates a binary participation matrix defining node participation on a per-layer basis, a subset of edge nodes from a group of edge nodes that collectively defines a federation, wherein the participation matrix is constrained such that (i) each layer of a multi-layer global model has at least one participating edge node, and (ii) each edge node participates in updates for no fewer than a minimum number of layers p_min and no more than a maximum number of layers p_max;

querying, by the central node, the edge nodes of the subset for only those layers for which the participation matrix indicates participation for updates to a global model maintained by the central node;

receiving, by the central node from the edge nodes of the subset, respective updates comprising complete layer-wise parameter gradients for the indicated layers and excluding gradients for non-indicated layers, to one or more layers of the global model; and updating, by the central node, the global model, on a layer-by-layer basis, using the updates received from the edge nodes of the subset, by aggregating only the received layer-wise gradients so as to produce updated layers while withholding sufficient gradient information to resist model inversion attacks while maintaining convergence of the global model.

2. The method as recited in claim 1, wherein there is a specified minimum and/or maximum number of nodes in the subset.

3. The method as recited in claim 1, wherein the global model is a machine learning model.

4. The method as recited in claim 1, wherein the updates comprise layers of one or more local instances of the global model running at the edge nodes.

5. The method as recited in claim 1, wherein each node that contributes an update transmits fewer than all layers of a model instance running at that node.

6. The method as recited in claim 1, wherein the updates each comprise one or more gradients.

7. The method as recited in claim 1, wherein the selecting, querying, receiving, and updating, are each performed for 'n' federated learning rounds until the global model converges, and 'n' is any integer equal to, or greater than, 1.

8. The method as recited in claim 1, wherein the updating comprises averaging respective parameter values of the updates to define respective parameter values for one or more layers of the global model.

9. The method as recited in claim 1, wherein the edge nodes selected for inclusion in the subset change from one round of federated learning training to another round of the federated learning training.

10. The method as recited in claim 1, wherein each node in the subset is limited to a number of times that that node will be queried for updates.

11. A non-transitory storage medium having stored therein instructions that are executable by one or more hardware processors to perform operations comprising:

stochastically selecting, by a central node, using a processor-implemented random sampling algorithm that populates a binary participation matrix defining node participation on a per-layer basis, a subset of edge nodes from a group of edge nodes that collectively defines a federation, wherein the participation matrix is constrained such that (i) each layer of a multi-layer global model has at least one participating edge node, and (ii) each edge node participates in updates for no fewer than a minimum number of layers p_min and no more than a maximum number of layers p_max;

querying, by the central node, the edge nodes of the subset for only those layers for which the participation matrix indicates participation for updates to a global model maintained by the central node;

receiving, by the central node from the edge nodes of the subset, respective updates comprising complete layer-wise parameter gradients for the indicated layers and excluding gradients for non-indicated layers, to one or more layers of the global model; and updating, by the central node, the global model, on a layer-by-layer basis, using the updates received from the edge nodes of the subset, by aggregating only the received layer-wise gradients so as to produce updated layers while withholding sufficient gradient information to resist model inversion attacks while maintaining convergence of the global model.

12. The non-transitory storage medium as recited in claim 11, wherein there is a specified minimum and/or maximum number of nodes in the subset.

13. The non-transitory storage medium as recited in claim 11, wherein the global model is a machine learning model.

14. The non-transitory storage medium as recited in claim 11, wherein the updates comprise layers of one or more local instances of the global model running at the edge nodes.

15. The non-transitory storage medium as recited in claim 11, wherein each node that contributes an update transmits fewer than all layers of a model instance running at that node.

16. The non-transitory storage medium as recited in claim 11, wherein the updates each comprise one or more gradients.

17. The non-transitory storage medium as recited in claim 11, wherein the selecting, querying, receiving, and updating, are each performed for 'n' federated learning rounds until the global model converges, and 'n' is any integer equal to, or greater than, 1.

18. The non-transitory storage medium as recited in claim 11, wherein the updating comprises averaging respective parameter values of the updates to define respective parameter values for one or more layers of the global model.

19. The non-transitory storage medium as recited in claim 11, wherein the edge nodes selected for inclusion in the subset change from one round of federated learning training to another round of the federated learning training.

20. The non-transitory storage medium as recited in claim 11, wherein each node in the subset is limited to a number of times that that node will be queried for updates.

* * * * *